June 23, 1970   A. W. HEMPHILL   3,516,567

SPACED WALL CONTAINER WITH DESICCANT SPACER RING BETWEEN WALLS

Original Filed Nov. 23, 1966

INVENTOR
ADLEY W. HEMPHILL

# United States Patent Office 3,516,567
Patented June 23, 1970

3,516,567
SPACED WALL CONTAINER WITH DESICCANT SPACER RING BETWEEN WALLS
Adley W. Hemphill, Baltimore, Md., assignor to W. R. Grace & Co., New York, N.Y., a corporation of Connecticut
Original application Nov. 23, 1966, Ser. No. 596,596. Divided and this application June 20, 1968, Ser. No. 766,341
Int. Cl. B65d 25/00
U.S. Cl. 220—14                                      3 Claims

ABSTRACT OF THE DISCLOSURE

Multi-wall units having spaced walls are provided with dessicant spacing means to prevent the formation of moisture between the walls. An example of such a unit is a multi-wall pharmaceutical container having at least one transparent wall retained in spaced relationship with regard to a second wall by a desiccant spacing means.

---

This application is a division of application Ser. No. 596,596, filed Nov. 23, 1966, now abandoned.

This invention relates to an internal moisture protected multiplate or multi-wall unit and to the method of making these units. In particular, the invention relates to a method of protecting multi-plate units such as, for example, typified by thermal-storm windows, certain pharmaceutical containers, etc., by utilizing an insulating spacing strip having a smooth cover material pervious to water vapor and an internal core of a desiccant material such as, for example, silica gel, molecular sieves, etc.

One of the features of my invention is the elimination of moisture contained within the air trapped within the multi-wall unit. Such moisture has represented a considerable problem to the prior art, especially so where transparency of the unit is desired. This moisture represents a particularly acute problem to transparency as a drop in temperature will cause the moisture to condense, and in some instances freeze, upon the glass walls, thereby impairing or destroying the transparency of the unit.

Multi-wall units, such as for example thermal storm windows, have long been known to the art and widely used because of their high thermal and sound insulating value. The main objection of these units has been the tendency to frost when exposed to low temperature. As before mentioned, this frosting is caused by the condensation of and freezing of moisture contained within the air entrapped between the glass sheets. It is extremely difficult, in spite of all the precautions taken during the manufacture or assembling of the wall units, to eliminate all the moisture contained within the trapped air and even where such moisture has been eliminated, there is still always the likely chance that water vapor from the atmosphere will permeate through one of the joints. The prior art has attempted to solve this problem by introducing anhydrous air or other anhydrous gas into the joint. This procedure is necessarily expensive and not entirely satisfactory. After the gas has been introduced into the unit, the unit must be sealed and then subjected to a dew point inspection to insure the unit will not frost or fog at the lowest temperature to which the unit will likely be subjected to during actual use. Some attempts have also been made to introduce a loose desiccant into the interior of the space. These attempts also have been largely unsuccessful. However, the major course of attack on this problem by the prior art has been to attempt to overcome this problem by the positive removal of the water vapor prior to its introduction into the unit. Applicant has found a relatively inexpensive solution to this problem which will protect the unit from moisture throughout the normal life of the unit and which does not have the objections incident to the desiccant solutions of the prior art.

The invention will be described with respect to the drawing, but is not limited thereto as various other embodiments and modifications may be made without departing from the scope of the invention, wherein.

Figure 1:
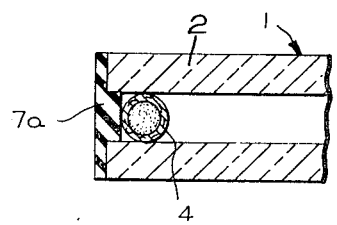
FIG. 1 is a vertical section through a double plate insulating unit; such as, for example, a thermal storm window.
Figure 2:
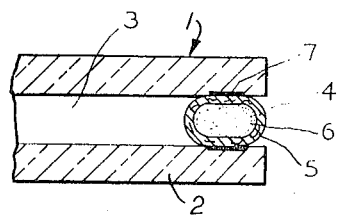
FIG. 2 is a vertical section through a double plate insulating unit, such as shown in FIG. 1, illustrating a second species of desiccant sealing means.

With respect to FIGS. 1 and 2, a double wall thermal unit 1 comprising sheets or plates of glass 2 is secured and maintained in spaced relationship 3 by desiccant spacing strips 4. The strips 4 comprise an outer cover of a moisture pervious material such as, for example, thin pressed cardboard, surrounding an internal core comprising a desiccant material such as, for example, silica gel or molecular sieves. In FIG. 2, 7 represents a sealing material or adhesive material used to secure the desiccant strips in place between the two plates of glass. The need for this adhesive material is largely a function of the intended use of the unit and the particular window mount or frame to be used. In some cases the sealing material may be eliminated or in other cases such as illustrated by 7a in FIG. 1 where the unit is designed for application where the edge of the unit will be unprotected or exposed to the atmosphere the sealing material may be extended across the exposed edge, thereby protecting the desiccant rod from the water vapor or mositure, rain, etc. of the atmosphere.

One method of constructing this unit is merely to place the desiccant spacing strip upon the lower pane of glass and then to place the upper pane of glass on top of the spacing strip. Suitable clamping means may then be used to secure the unit together prior to its placement in the mounting frame. In another modification, a sealing material or adhesive may be placed upon the lower pane prior to the placement of the desiccant rod or may be placed on the desiccant rod. However, caution must be taken to insure that the portion of the desiccant rod exposed to the interior space 3 is not covered with sealing material. If it is desired to use a sealing unit such as 7a this unit is simply placed in position at any stage in the assembly, preferably after the upper plate has been assembled upon the desiccant spacing strip. The element 7a may either be performed, such as for example, a rubber molding sealing strip and secured in place with a suitable adhesive or it may be formed in place by simply spreading a suitable sealing adhesive material, such as for example, one of the conventional plastic resins, across the exposed edge and allowing the material to set.

Figure 3:
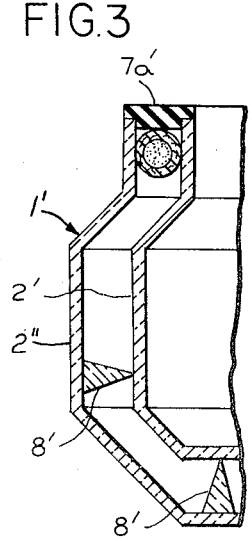
FIG. 3 is a vertical sectional view illustrating another embodiment of this invention, i.e., a double wall container, such as, for example, could be used in the pharmaceutical industries.
Figure 4:
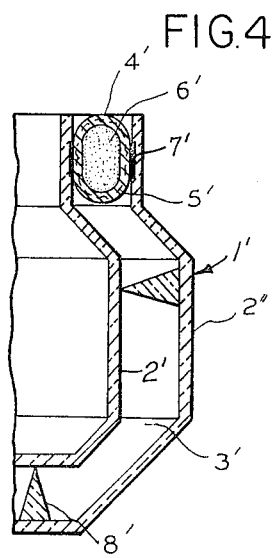
FIG. 4 is a vertical sectional view of a double wall container, such as shown in FIG. 3, illustrating a second species of desiccant sealing means.

With respect to FIGS. 3 and 4, 1' illustrates a moisture protected multi-wall container which employs a spacer ring comprising an outer covering 5' and inner desiccant core 6'. The desiccant is essentially the same type as used in FIG. 1, except for size. 7a' and 7' illustrate sealing or adhesive material as in FIGS. 1 and 2 respectively.

8' illustrates optional spacing lugs which may be initially formed on either the interior face of the outer container 2" or the exterior face of the inner container 2'. The container may be easily constructed by positioning the internal container within the external container by means of a holding jig suitably positioned within the container. Where the optional spacing pins are used, the inner container may be simply supported on these lugs and the holding jig omitted. Also it is possible to adhesively secure small desiccant rod strips to the walls of one of the containers to act as the spacing pins. The desiccant spacing strip 4' may then be positioned between the necks of the containers, as shown in FIGS. 3 and 4. A suitable adhesive and/or sealing compound may then be placed on the spacing strip to suitably seal the exterior wall and maintain the sealing strip in position. The only requirement again being that the sealing material does not cover the surface of the desiccant rod exposed to the interior space 3'. The sealing material may be applied by the same methods as discussed above with respect to FIG. 1.

Figure 5:
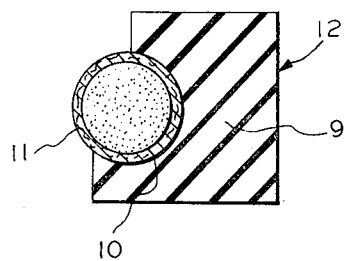
FIG. 5 is a vertical sectional view illustrating a further embodiment wherein a conventional spacing strip is modified by the incorporation of a desiccant rod.

In the embodiment illustrated by FIG. 5, a conventional spacing or sealing strip 9 is grooved or recessed with channel 10 to facilitate the incorporation of desiccant rod 11. In another embodiment, the channel may be omitted and the desiccant rod may be affixed to the spacing strip by a suitable adhesive (e.g. epoxy resin, rubber cement, etc.); care again being taken to ensure that a sufficient portion of the pervious desiccant rod wall remains uncovered to permit the free flow of moisture therethrough. It is, of course, clear that the desiccant rod does not have to be co-extensive with the spacing strip and may be incorporated in only selective portions of the spacing or sealing strip. This is particularly applicable where the desiccant rod is incorporated into a sealing ring or any configuration having a different longitudinal configuration than the desiccant rod which is normally prepared as a straight strip. The spacing or sealing strip may be made of any of the conventional materials, normally used for such strips; for example, synthetic or natural rubber, polystyrene, polyurethane, polyethylene, polypropylene, Teflon, etc.

In preferred embodiments of FIGS. 1 and 4, a modified spacing strip 12 may be used in place of the desiccant rod spacing strip, as the modified spacing strips will necessarily have better resiliency and flexibility as well as affording increased protection for the desiccant rod from the atmosphere.

The desiccant rod itself may be made in any conventional manner and does not form a part of this invention. For example, the desiccant rod may be made by mixing a suitable fluid binder with the desiccant and simultaneously extruding the desiccant core and covering or jacket through a conventional extrusion head having concentric nozzles or orifices, the desiccant being extruded through the inner nozzle and the jacket material through the surrounding outer nozzle. Also desiccant rods could be preformed in the desired size and configuration by simple compression molding.

Obviously many modifications and variations may be made without departing from the scope and essence of the invention.

What is claimed is:

1. A multi-wall container comprising an inner container and an outer container in spaced relationship to and substantially surrounding said inner container, said inner and outer containers having concentric spaced neck portions, a spacing ring disposed between said neck portions, said inner and outer containers and said spacing ring defining a closed chamber and wherein said spacing ring comprises a moisture pervious jacket and an inner core consisting essentially of a desiccant whereby any moisture which may be in or enter said chamber will be adsorbed by the spacing ring desiccant.

2. The multi-wall container of claim 1 where at least one of the containers is transparent.

3. The multi-wall container of claim 1 wherein the spacing ring is sealed from the atmosphere and affixed to the container neck portions with an adhesive sealing material.

References Cited
UNITED STATES PATENTS

| | | | |
|---|---|---|---|
| 1,482,626 | 2/1924 | Whiting. | |
| 1,964,795 | 7/1934 | Frary | 220—15 |
| 2,072,630 | 3/1937 | Ferry | 215—13 |
| 2,144,820 | 1/1939 | Thomas | 215—13 X |
| 2,524,162 | 10/1950 | Chavannes et al. | |
| 2,674,509 | 4/1954 | Barnet | 312—31 |
| 2,834,187 | 5/1958 | Loveday. | |

JOSEPH R. LECLAIR, Primary Examiner

J. R. GARRETT, Assistant Examiner

U.S. Cl. X.R.

215—13; 220—15